3,027,410
PROCESS FOR THE PRODUCTION OF CYCLOHEXANONE

Guenter Poehler, Ludwigshafen (Rhine), and Anton Wegerich, Limburgerhof, Pfalz, Germany, assignors to Badische Anilin- & Soda-Fabrik Aktiengesellschaft, Ludwigshafen (Rhine), Germany
No Drawing. Filed Sept. 25, 1959, Ser. No. 842,197
Claims priority, application Germany Oct. 1, 1958
6 Claims. (Cl. 260—586)

This invention relates to a process for the production of cyclohexanone. More specifically, it relates to a process for the production of cyclohexanone by reacting aniline or nitrobenzene with water and hydrogen at elevated temperature in the presence of hydrogenation catalysts and dehydrogenating the mixture thus obtained with simultaneous hydrolysis.

It is known to prepare from aniline, by reaction with hydrogen and water in the presence of hydrogenation catalysts at elevated temperature, a mixture of different hydrogenation products of aniline, which contains varying amounts of cyclohexanol as well as small amounts of cyclohexanone. Even by carrying out a sequence of a number of treatment stages of this kind, however, there does not result a reaction product enriched in cyclohexanone. Following this hydrogenating treatment of aniline, instead of which nitrobenzene has also previously been used as initial material there has therefore been carried out a dehydrogenation treatment of the reaction mixture obtained in the first stage in the presence of dehydrogenation catalysts at elevated temperature in the absence of hydrogen with water or aliphatic monohydric alcohols. Pressure has also been used in prior processes. The exclusion of hydrogen, the rise in temperature and the pressure treatment in the second stage have however not led to a nearly amine-free reaction product, although it is possible by these measures to increase the proportion of cyclohexanone in the reaction product. In the previous methods, the mixture obtained in the hydrogenation stage had to be carefully separated by distillation before the cyclohexanol was dehydrogenated, since in the dehydrogenation stage only the cyclohexanol could be converted to cyclohexanone. The amine separated in the distillation had to be subjected to another saponification treatment. Distillative separation of amine and cyclohexanone after dehydrogenation is not practicable since condensation of the cyclohexanone with primary amine would occur. However carefully the distillation between the hydrogenation and dehydrogenation stages was conducted, all of the amine could never be removed and the cyclohexanone obtained as the end product therefore always contained impurities.

We have now found that an amine-free product which contains a very high proportion of cyclohexanone is obtained by leading aniline or nitrobenzene with an equal or multiple amount by weight of water or steam and with an excess of hydrogen at temperatures of 150° to 300° C. over hydrogenation catalysts, cooling the reaction mixture formed, freeing it from the gaseous constituents and reacting it in a pressure vessel in the liquid state at a temperature of 250° to 350° C. in the presence of dehydrogenation catalysts essentially under the vapor pressure, set up by the said temperature, of the water-containing reaction mixture, the hydrogen and ammonia formed during the reaction being removed continuously from the pressure vessel. By the phrase "essentially under the vapor pressure set up by the said temperature" we mean that the vapor which is set up above the liquid dehydrogenation mixture at the dehydrogenation temperature should not, or only inconsiderably, be allowed to vary as a result of the measures described herein, i.e., removing oxygen and ammonia, stirring and heating the mixture by blowing steam or introducing inert gases into the dehydrogenation stage.

For carrying out the process, aniline or nitrobenzene in the gaseous or liquid state is reacted with the same or a multiple amount of water or steam, e.g. 3 to 10 times by weight, and with an excess, preferably a multiple excess, of hydrogen at temperatures of 150° to 300° C., advantageously 170° to 225° C. This reaction is carried out in the presence of conventional hydrogenation catalysts, for example in the presence of heavy metals of groups I, II and VIII of the periodic system or their oxides or sulfides. Catalysts which are suitable for the purposes of the present invention are, for example, copper, zinc, nickel or iron in metallic, for example finely divided form, or also oxides or compounds thereof provided they are capable of passing into a catalytically active state under the conditions of the reaction. The catalysts for the hydrogenating treatment may also be applied to carriers, such as silica, natural or synthetic silicates, active aluminas, titanium oxide, zinc oxide or magnesia. In general it is sufficient if the active components are applied to the carrier in amounts of 1 to 20% by weight. The catalysts may be used in the form of pills, in granulated or powder form, rigidly arranged in the reaction chamber or held in fluidized motion. A nickel catalyst which contains for example 1 to 15% of nickel on pumice or silica strings, has proved to be especially advantageous. The hydrogenating treatment can be carried out at normal or increased pressure, for example at 50 to 325 atmospheres. When using nitrobenzene as initial material, the use of increased pressure offers advantages.

Having regard to the exothermic course of the reaction of the first stage, it is preferable to lead away heat with a large excess of hydrogen. By an excess of hydrogen we understand a multiple, for example 10 to 40 times the amount of hydrogen theoretically necessary, i.e., 3 mols of hydrogen per mol of aniline and 6 mols of hydrogen per mol of nitrobenzene. For example the reaction may be carried out in a tubular furnace and a great part of the heat withdrawn with the aid of a cooling medium. The temperature may also be lowered however by supplying a part of the hydrogen in a cold state at different points to the reaction vessel. The reaction mixture from the first stage is led, after cooling, into a separator in which the liquid constituents are separated from the gaseous constituents.

The liquid constituents of the reaction mixture from the first stage, which contain in the main cyclohexanol, cyclohexylamine and dicyclohexylamine, besides ammoniacal water, may be introduced, after heating up to 200° C. or more, continuously or batchwise into a pressure vessel in which the second reaction stage—the dehydrogenating treatment—proceeds. The dehydrogenating treatment is carried out without supply of hydrogen at a temperature of 250° to 350° C. in a pressure vessel. The reaction is carried out at essentially the vapor pressure of the reaction mixture determined by the temperature chosen. The accurate regulation of the pressure in the pressure vessel results from the continuous decompression of gaseous reaction products formed, such as hydrogen and ammonia. The continuous removal of the gaseous reaction products, such as hydrogen and ammonia, by a trivial partial decompression, for example through a regulatable pressure valve, should be controlled so that no considerable vaporization of the liquid portion of the reaction mixture takes place by the decompression, i.e., so that a pressure results which is only slightly, for example up to 1 atmosphere, below the pressure which is set up by the vapor pressure of the reaction mixture at the temperature in question. In general, working is between 40 and 60 atmospheres. The gaseous constituents may be led through a reflux condenser by which the entrained condensable constituents are liquefied prior to decompression and returned to the reaction chamber.

The catalysts used are dehydrogenation catalysts, such as the heavy metals of groups I, II or VIII of the periodic system, for example copper, nickel, zinc, or their compounds, such as the oxides of these metals. The catalysts may be applied to carriers, such as silica, silicates, titanium oxide or alumina. It is preferable to increase the water concentration in the second process stage by the additional supply of steam. By the addition of steam it is possible to maintain the reaction temperature and to complete the course of the reaction.

It is a special feature of our new process that the hydrolysis of the amines takes place simultaneously with the dehydrogenation of the cyclohexanol. Previous distillation is therefore superfluous and the new process therefore saves a considerable amount of time, energy and products.

The advantage of the process consists in the fact that in continuous, partly discontinuous or discontinuous operation there is obtained in good yields a product which consists mainly of cyclohexanone and, contrasted with the processes hitherto known, is free from amines. Carrying out the process according to this invention includes as an essential feature the continuous removal of the hydrogen and gaseous ammonia formed from the dehydrogenation stage. By this feature the reversible equilibrium reaction between cyclohexylamine or dicyclohexylamine and water to cyclohexanol and ammonia is displaced in favor of the formation of cyclohexanol. The continuous removal of hydrogen moreover promotes the further dehydrogenation to cyclohexanone which in turn, in contrast to cyclohexanol, can no longer react with the ammonia still present with the formation of amines. The production of an amine-free cyclohexanone-cyclohexanol mixture which contains mainly cyclohexanone, is however of special importance because in the distillative separation of the oxidation product, the presence of amines, such as cyclohexylamine and dicyclohexylamine or phenylcyclohexylamine, is disturbing, because they form azomethines with cyclohexanone.

In carrying out the process on an industrial scale, the dehydrogenation of the liquid portion of the reaction mixture obtained in the first stage can be effected in various ways. One embodiment consists in heating up the liquid fraction and supplying it with the addition of a finely divided dehydrogenation catalyst to a pressure vessel in which a definite liquid level is maintained. The thorough mixing of the dehydrogenation mixture may be effected for example by a stirring device. It is especially advantageous to effect the thorough mixing of the liquid and catalyst by blowing in steam. It is also possible to maintain a liquid circulation in which the liquid is withdrawn at the lower end of the reaction vessel and returned to the reaction vessel, if necessary after removing the spent catalyst and adding fresh catalyst. Since the course of the reaction in the second stage is endothermic, the desired reaction temperature and consequently the pressure in the reaction vessel can be regulated by the amount and pressure of the steam introduced. An indirect heating by in-built helical tubes is also possible. A part of the steam can be replaced by heated inert gas, such as nitrogen, if at the same time the supply of heat is increased by an external heating of the reaction vessel. The reaction vessel is preferably arranged vertically and the gases enriched with vapors escaping from the reaction mixture, prior to their decompression, led through a reflux condenser in which condensable constituents are separated and returned to the reaction chamber. The condensed constituents flow back into the reaction chamber while hydrogen and ammonia escape through a pressure release valve. It is preferable to use as the reflux condenser a dephlegmator in which the inflowing vapor and condensate flow in countercurrent. It is advantageous also to use a rectifying headpiece in order to further enrich the gas.

This method of carrying out the second stage of the process also permits a subdivision of the dehydrogenation into two or more stages, operation in each stage being under the above-specified conditions and under the same or increased temperature in each stage. A subdivision of the second process stage in this embodiment is above all preferable if the dehydrogenation product should still contain small amounts of amines.

Another embodiment of the second process stage, in which the amines contained in the liquid fraction of the reaction product of the first stage can be completely reacted in one stage, is the trickling process. In this embodiment there is used for the dehydrogenation treatment, for example a vertical pressure vessel which is filled with a rigidly arranged catalyst. The preheated liquid reaction product of the first stage together with the ammoniacal water contained therein trickles over the catalyst. The catalyst may also be arranged at different heights in the pressure vessel on different gratings, the total thickness of the layer of catalyst being the same but the thickness of the individual layers being reduced. At the lower end of the pressure vessel a sump forms which can be heated externally. A heating coil may be arranged in the sump or a part of the sump may be withdrawn continuously and returned to the reaction vessel through a circulatory vaporizer. In carrying out the dehydrogenation by the trickling method the heating of the reaction vessel may also be effected by blowing in steam under pressure. The sump liquid can be withdrawn and trickled repeatedly over the catalyst through a circulation which passes through a pump. To remove hydrogen and ammonia, there may additionally be led in inert gases, such as nitrogen. The decompression of the gases formed takes place in the same way as has been described with reference to the first embodiment.

Instead of providing a rigid catalyst arrangement, the vertical pressure vessel may also be provided with filler bodies or insertions, such as sieve plates, bubble trays or baffle plates. The catalyst is then mixed in finely divided form with the liquid hydrogenation product of the first stage and the dehydrogenation mixture added to the upper part of the pressure vessel, whence it trickles over the insertions and forms a sump at the lower end. The supply of steam preferably takes place into the lower part of the pressure vessel.

The following examples will further illustrate this invention but the invention is not restricted to these examples.

*Example 1*

2 kg. of an amine-containing cyclohexanol which has been obtained by reaction of nitrobenzene with hydrogen and water in the presence of hydrogenation catalysts at elevated temperature has 2 liters of water and 100 grams of Raney copper added to it and the mixture is reacted in an 8 liter autoclave provided with a stirrer. The contents of the autoclave are well blended and heated to 285° C. The gaseous products formed in the reaction are carefully decompressed by way of a reflux condenser and a steam pressure of about 65 atmospheres is set up. After both ammonia and hydrogen have been withdrawn the autoclave is emptied by leading its contents through a cooler and the reaction product is separated from the catalyst. The catalyst can be used for a new batch. The reaction product contains 72% of cyclohexanone in addition to cyclohexanol and about 1.1% of unreacted amines. It can be readily worked up by distillation. For a complete conversion of the unreacted amines it may however be subjected to another dehydrogenation treatment.

*Example 2*

Aniline with an equal weight of steam and together with hydrogen is led at 200° C. in a reaction vessel over a catalyst which contains 6% by weight of nickel on pumice calculated on the weight of catalyst and carrier. The reaction mixture is condensed and led into a separator in which the gaseous constituents are separated at 50° C. The hydrogen which is contained in the gaseous constituents is separated by a washing with water and returned to the reaction chamber. The liquid fraction of the reaction mixture of the first stage, which mainly contains cyclohexanol, cyclohexylamine and dicyclohexylamine, besides ammoniacal water, has finely divided copper added to it and is heated in a preheater to 250° C., whereby a pressure of 55 atmospheres is set up. The liquid reaction mixture is continuously supplied to the lower part of a heated vertical reaction vessel, which fills with the reaction liquid, while simultaneously a small amount of steam is introduced into the same part of the vessel in order to keep the reaction liquid-catalyst suspension in motion. From the upper part of the said vessel the liquid flows through a pipe into the lower part of another heated vertical reaction vessel and this second vessel also fills with the suspension of reaction liquid and catalyst. From the upper part of the said second reaction vessel the reaction liquid and the catalyst flow through a pipe into a third heated vertical reaction vessel and this third reaction vessel is also filled. An amount of steam which is just sufficient to keep the suspension in motion is introduced into both the second and third vessels. From the upper part of the third vessel the suspension is supplied to a separator. The reaction liquid in all the three reaction vessels is maintained at a temperature of about 260° C. and under a pressure of 55 atmospheres. Both the hydrogen set free during the reaction and ammonia are continuously withdrawn at the upper ends of each of the three reaction vessels, then led through a reflux condenser and decompressed. The entrained condensed parts flow back from the reflux condenser into the reaction vessel. An eyepiece is provided between the reaction vessel and the reflux condenser. The pressure valves are so controlled that there is no appreciable vaporization of the liquid portions. This can readily be judged from the amount of condensate which flows past the eyepiece. If the amount of condensate is too large, the supply has to be throttled in order to avoid vaporization. The liquid circulating in the apparatus contains 5% by weight, calculated on the liquid, of copper as catalyst. Finely divided nickel or mixtures of the two metals may also be used. The reaction product is cooled, decompressed and separated by distillation after the water has been separated.

780 kilograms of cyclohexanone, 210 kilograms of cyclohexanol and 25 kilograms of residue are formed from 1000 kg. of aniline by the process.

What we claim is:

1. A process for the production of cyclohexanone which comprises: heating a compound selected from the group consisting of aniline and nitrobenzene with water and hydrogen at a temperature of 150° C. to 300° C. in the presence of a hydrogenation catalyst to produce a crude liquid product consisting primarily of cyclohexanol, cyclohexylamine, dicyclohexylamine and ammoniacal water; cooling said liquid product and separating gaseous components therefrom; dehydrogenating the resulting liquid product as a liquid reaction mixture in an enclosed reaction system at a temperature of 250° C. to 350° C. and in the presence of a dehydrogenation catalyst, the pressure of said reaction system being maintained approximately at a value corresponding to the vapor pressure of said liquid reaction mixture at the reaction temperature by continuously removing hydrogen and ammonia formed during the reaction from the enclosed reaction system.

2. A process as claimed in claim 1 wherein the pressure of the dehydrogenation reaction is between about 40 and 60 atmospheres.

3. A process as claimed in claim 1 wherein vapors entrained with the hydrogen and ammonia gaseous components are condensed and returned to said liquid reaction mixture.

4. A process as claimed in claim 1 wherein the hydrogenation catalyst is a member selected from the group consisting of a heavy metal of groups I, II and VIII of the periodic system and the oxides and sulfides of said metals, and the dehydrogenation catalyst is a member selected from the group consisting of a heavy metal of groups I, II and VIII of the periodic system and oxides of said metals.

5. A process as claimed in claim 4 wherein a nickel catalyst containing 1 to 15% nickel by weight, calculated on the total of the catalyst, is used as hydrogenation catalyst.

6. A process as claimed in claim 4 wherein a copper catalyst is used as dehydrogenation catalyst.

References Cited in the file of this patent

UNITED STATES PATENTS

| | | |
|---|---|---|
| 2,387,617 | Schmidt et al. | Oct. 23, 1945 |
| 2,829,165 | Coussemant | Apr. 1, 1958 |

FOREIGN PATENTS

| | | |
|---|---|---|
| 1,052,983 | Germany | Mar. 19, 1959 |